May 12, 1925.  1,537,590
J. DLESK, JR
METHOD OF ASSEMBLING BALL BEARINGS
Filed May 3, 1924
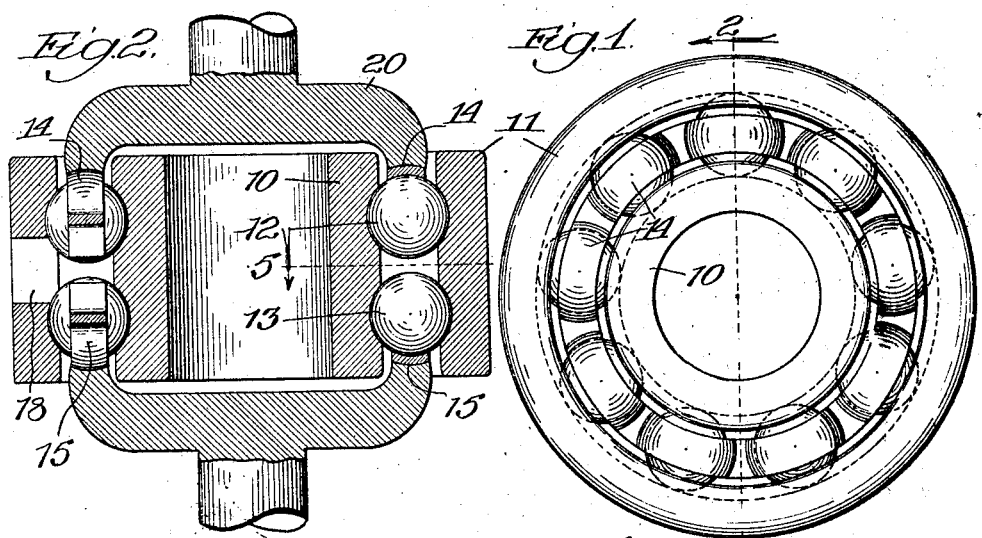
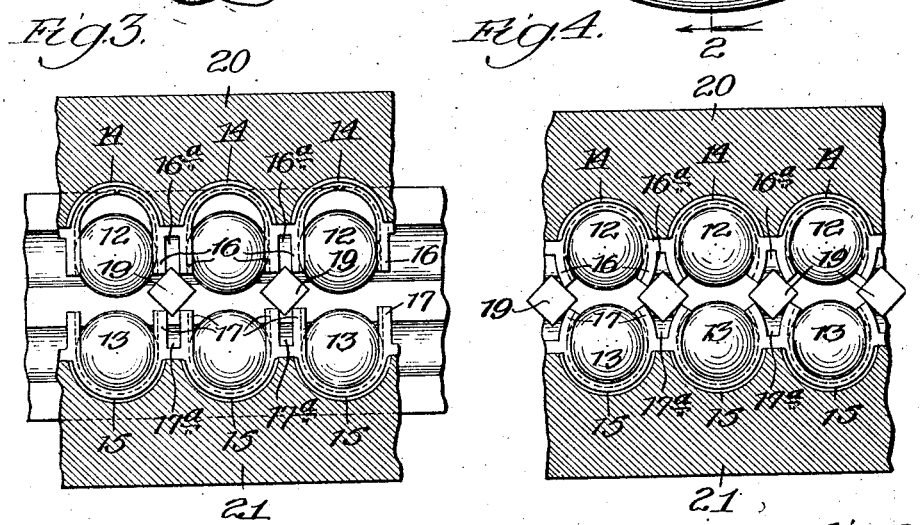
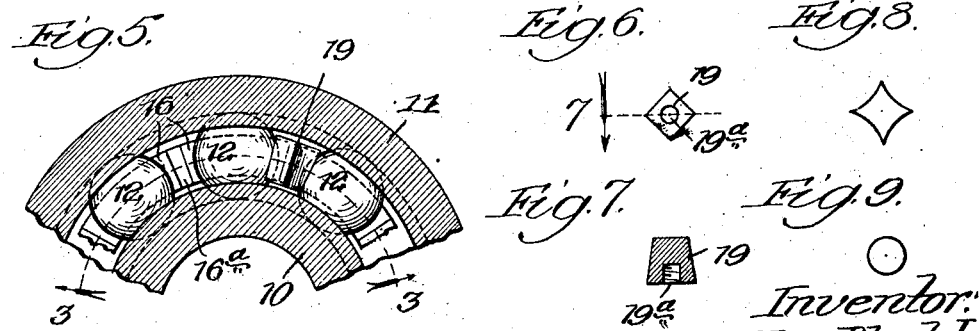
Inventor:
John Dlesk Jr.

Patented May 12, 1925.

1,537,590

UNITED STATES PATENT OFFICE.

JOHN DLESK, JR., OF CHICAGO, ILLINOIS, ASSIGNOR TO STROM BALL BEARING MANUFACTURING COMPANY, OF CHICAGO, ILLINOIS, A CORPORATION OF ILLINOIS.

METHOD OF ASSEMBLING BALL BEARINGS.

Application filed May 3, 1924. Serial No. 710,776.

*To all whom it may concern:*

Be it known that I, JOHN DLESK, Jr., a citizen of the United States, residing at Chicago, in the county of Cook and State of Illinois, have invented a new and useful Improvement in Methods of Assembling Ball Bearings, of which the following is a specification.

This invention relates to methods of assembling ball bearings, particularly those of the two row radial type.

The primary object of this invention is to provide a method for quickly and satisfactorily assembling two row radial ball bearings. Because of the fact that it is very difficult to get at the spring between the two rows of a ball bearing of this type, it has been necessary to resort to various devices for securing the retainer on the second row of balls. None of the means heretofore employed, however, so far as applicant is able to ascertain has enabled the operator to simultaneously secure ball retainers to both ball sets.

The present invention accomplishes this result and is fully described in the following specification and shown in the accompanying drawings in which:

Figure 1 is a front elevation of a bearing assembled according to this invention;

Fig. 2 is a longitudinal section on the line 2—2 of Fig. 1;

Fig. 3 is a developed section on the line 3—3 of Fig. 5 showing the parts after being loosely assembled;

Fig. 4 is a similar view showing the parts during the pressing operation;

Fig. 5 is a partial transverse section on the line 5 of Fig. 2;

Fig. 6 is an outer end elevation of a spreader employed for setting the retainers about the balls;

Fig. 7 is a longitudinal section on the line 7 of Fig. 6; and

Figs. 8 and 9 are end elevations of other forms of conical spreaders.

The embodiment illustrated comprises a two row radial ball bearing having inner and outer raceways 10 and 11 respectively, which has two rows of balls 12 and 13 therein. The desired number of balls are first placed in the raceways in the two rows 12 and 13 and retainers 14 and 15 placed thereover from the outside, the fingers 16 and 17 being set opposite each other as shown in Fig. 3, these fingers being arranged in pairs with slots 16ª and 17ª therebetween.

The outer race member 11 has an opening 18 therein lying midway between the raceways so that spreaders 19 of a preferably diamond shape cross section as shown in Figs. 6 and 7 may be passed through the opening 18 and placed between the fingers 16 and 17 as shown in Fig. 3, and in the slots 16ª and 17ª.

Die members 20 and 21 preferably fitting the outer contour of the retainers 14 and 15, are placed above and below the same. Pressure is then applied forcing the retainers toward each other, the bendable fingers 16 and 17 being bent above the balls as shown in Fig. 4 so as to fasten the retainers thereon.

The spreaders 19 are preferably made conical as illustrated, the larger end being at the outside and toward the opening 18. After the pressing operation, the bearing is removed from the dies 20 and 21, the spreaders are removed by bringing each successively in front of the opening when a jar will cause it to drop out.

Various forms of spreaders may be employed for this purpose, two of which are shown in Figs. 8 and 9. Sometimes difficulty may be experienced in removing the spreaders, particularly when they are straight instead of conical and for this reason it may sometimes be advisable to employ means to assist in their removal such as providing tapered holes 19ª as shown in Fig. 7, for the insertion of a threaded instrument.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. The method of assembling two row radial ball bearings consisting of placing the balls in the raceways, inserting retainers with bendable ears from opposite sides of said balls, placing spreaders between said retainers and in the paths of said ears, pressing said retainers and ears about said balls, and removing said spreaders.

2. The method of assembling two row radial ball bearings consisting of placing the balls in the raceways, inserting retainers with bendable ears from opposite sides of said balls, placing spreaders between said retainers and in the paths of said ears, pressing said retainers and ears about said balls, and removing said spreaders through an opening in one of said raceways.

3. The method of assembling two row radial ball bearings consisting of placing the balls in the raceways, inserting retainers with bendable ears from opposite sides of said balls, placing spreaders between said retainers and in the paths of said ears, pressing said retainers and ears about said balls, and removing said spreaders through an opening between the raceways of the outer race member.

4. The method of assembling two row radial ball bearings consisting of placing the balls in the raceways, inserting retainers with bendable ears from opposite sides of said balls, placing radial spreaders between said retainers and in the paths of said ears, pressing said retainers and ears about said balls, and removing said spreaders.

5. The method of assembling two-row ball bearings consisting of placing the balls in the raceways, inserting a retainer on each set of balls, said retainers having U-shaped pockets enclosing the balls, the facing ends of the pockets being bendable about the balls, placing spreaders between said retainers, pressing the retainers outwardly to cause said spreaders to bend the ears about said balls, and removing said spreaders.

JOHN DLESK, Jr.